United States Patent
Lebez et al.

(10) Patent No.: US 6,207,785 B1
(45) Date of Patent: Mar. 27, 2001

(54) HYDROXYLATED POLYDIENE BASED HOT-MELT ADHESIVE COMPOSITIONS

(75) Inventors: Jean Lebez, Evreux; Jean-Jacques Flat, Serquigny; Jean-Michel Pierrot, Grosley sur Risle, all of (FR)

(73) Assignee: Atofina, Paris la Defense Cedex (FR)

( * ) Notice: Subject to any disclaimer, the term of this patent is extended or adjusted under 35 U.S.C. 154(b) by 0 days.

(21) Appl. No.: 09/230,724

(22) PCT Filed: May 28, 1998

(86) PCT No.: PCT/FR98/01063

§ 371 Date: Oct. 14, 1999

§ 102(e) Date: Oct. 14, 1999

(87) PCT Pub. No.: WO98/54270

PCT Pub. Date: Dec. 3, 1998

(30) Foreign Application Priority Data

May 29, 1997 (FR) .................................................. 97 06584

(51) Int. Cl.⁷ .................................................... C08G 18/62
(52) U.S. Cl. .............................. 528/75; 525/123; 525/125
(58) Field of Search ................................ 525/125; 528/75

(56) References Cited

U.S. PATENT DOCUMENTS 5,922,805 * 7/1999 Bauttefort et al. ................... 524/590

FOREIGN PATENT DOCUMENTS 0 600 767  6/1994  (EP) .

OTHER PUBLICATIONS

Patent Abstract of Japan, vol. 008, No. 062 (C–215), Mar. 23, 1984 & JP 58 217575 A (UNITIKA KK), Dec. 17, 1983 (see abstract).

* cited by examiner

*Primary Examiner*—Rachel Gorr

(57) ABSTRACT

The invention relates to hot-melt adhesive (HMA) compositions which are provided in the form of a polymer containing free isocyanate functional groups, the said polymer resulting from the reaction of a polyisocyanate (A), of a polydienopolyol (B) and of a copolymer (C) of ethylene containing hydroxyl functional groups. They have a low viscosity and can thus be employed from 110° C. They can be crosslinked with atmospheric moisture.

7 Claims, No Drawings

HYDROXYLATED POLYDIENE BASED HOT-MELT ADHESIVE COMPOSITIONS

The present invention relates to hot-melt adhesive compositions based on hydroxylated polydiene and more particularly to hot-melt adhesive (HMA) compositions which are provided in the form of a polymer containing free isocyanate functional groups, the said polymer resulting from the reaction of a polyisocyanate (A), of a polydienepolyol (B) and of a copolymer (C) of ethylene containing hydroxyl functional groups.

According to a specific form of the invention, the polydienepolyol is a hydroxytelechelic polybutadiene and the copolymer (C) is either an ethylene/vinyl acetate/hydroxyethyl (meth)acrylate copolymer or an ethylene/alkyl (meth)acrylate/hydroxyethyl (meth)acrylate copolymer.

This composition, generally used in combination with an adhesive (tackifying) resin, makes it possible to produce bondings which are resistant to high temperature after crosslinking of the free NCO functional groups, generally under the effect of atmospheric moisture.

For some years, there has been an increasing search to present adhesive compositions in the solid form. In this case, they are hot-melt adhesives (HMA) having, as base, a thermoplastic resin which is solid at room temperature. These adhesives become fluid when heated, the bonding of the surfaces to be joined being ensured when the adhesive again becomes stiff on cooling. These hot-melt adhesives generally result from the combination of three base constituents: a thermoplastic resin, an adhesive (tackifying) resin and a wax, with which may be combined additives such as stabilizer, filler, plasticizers and others. The most well known base thermoplastic resins are polyamides, atactic polypropylene, ethylene/vinyl acetate (EVA) copolymers and ethylene/alkyl (meth)acrylate copolymers. In the present state, these hot-melt adhesives have good adhesive properties but have the disadvantage of exhibiting poor heat resistance, a resistance which barely exceeds 60 to 80° C.

To overcome this disadvantage, a new generation of crosslinkable hot-melt products: polyurethane hot-melt adhesives, is developed. These products are prepared conventionally by reaction of polyisocyanate with polyols of polyester type, at least one of which is solid at ambient temperature. These adhesives are applied at high temperature as a melt phase. They have the disadvantage of being incompatible with the adhesive (tackifying) resins, which greatly restricts the formulation possibilities. This is then reflected by a limited ability to bond to certain well defined substrates. In addition, these products have assembly times of the order of a few minutes, which is too long for some high-output-rate applications. The assembly time of a hot-melt adhesive is the time available for performing the bonding, between the instant when the adhesive is applied in the molten state to the first substrate to be bonded and the instant when the hot-melt adhesive is no longer sufficiently fluid to allow the second substrate to be assembled correctly.

Another type of crosslinkable hot-melt adhesive has been developed from hydroxylated ethylene/vinyl acetate copolymers reacting with a blocked polyisocyanate in stoichiometric amount, as described in European Patent EP 294,271. These hot-melt adhesives, which are compatible with the adhesive (tackifying) resins, have good adhesive properties but have the disadvantage of requiring subsequent heat treatments at temperatures of at least 140° C. for several minutes, to ensure their good crosslinking. Such bonding conditions are not acceptable in the case of some thermally sensitive substrates.

EP 380,379 describes crosslinkable hot-melt adhesive compositions which are provided in the form of a prepolymer containing free isocyanate functional groups, the said prepolymer resulting from the reaction of a copolymer of ethylene and of vinyl acetate containing hydroxyl functional groups with a polyisocyanate. This prior art describes the copolymers obtained by direct copolymerization of ethylene, of vinyl acetate and of hydroxyethyl acrylate, as well as the ethylene/vinyl acetate/vinyl alcohol copolymers obtained by partial hydrolysis of ethylene/vinyl acetate copolymers.

EP 600,767 is similar to the above but a primary alcohol (dodcanol) is added to the ethylene/vinyl acetate/hydroxyethyl acrylate copolymer.

The essential difference in composition between these prior arts and the present invention is thus the joint use of polydienepolyol and of a hydroxylated copolymer (C) for reacting with the polyisocyanate, instead of EVA/HEA (ethylene/vinyl acetate/hydroxyethyl acrylate copolymer) alone or instead of EVA/HEA and dodecanol.

This makes it possible:
to reduce the viscosity of the prepolymer during the preparation, all the more so since the EVA/HEAs have low MFI values, and thus to facilitate the synthesis of the HMA. The flow index is denoted by MI (Melt Index) or MFI (Melt Flow Index),
after preparation, to give an HMA which has a lower viscosity, especially if the starting material is an EVA/HEA with a low MFI value, and thus to make it possible to employ the HMA at a lower temperature (110–140° C.),
to improve the low-temperature performance, by virtue of the addition of a compound with a very low Tg,
to improve the applicative performance of the HMA, in particular in terms of resistance to hydrolysis and mechanical, adhesive and cohesive properties.

It is also possible to add, to the compositions of the invention, a speciality monoalcohol (hydroxylated tackifying resins).

EP 293,602 describes hot-melt adhesive compositions comprising (i) the reaction product of a polyisocyanate with a polyol and (ii) a thermoplastic polymer, such as an EVA (ethylene/vinyl acetate copolymer) or an SEBS (styrene-ethylene/butene-styrene block copolymer). The thermoplastic polymer (ii) is not functionalized and it is therefore not bonded to the polyurethane network formed during the crosslinking, whereas, in the present invention, the copolymer (C) is bonded to the polyurethane network. Thus, the compositions of the invention have the following advantages:

1. Improvement in the mechanical, peel and cohesion properties of an HMA adhesive seal in temperature by crosslinking with atmospheric moisture.
2. Possibility of applying the hot-melt adhesive at "low temperature" (110–140° C.).
3. Improvement in the low-temperature adhesive performance.
4. Improvement in the applicative performance of the hot-melt adhesive.
   Resistance to hydrolysis
   Adhesion
   Mechanical strength
   Cohesion.

The polyisocyanate (A) is generally chosen from aliphatic, cycloaliphatic or aromatic polyisocyanates well known to a person skilled in the art, as well as mixtures of these compounds.

Mention may be made, as examples of aliphatic polyisocyanates, of hexamethylene diisocyanate (HDI), trimethylhexamethylene diisocyanate (HMDI), ethylene diisocyanate, ethylidene diisocyanate, propylene diisocyanate, butylene diisocyanate, dichlorohexamethylene diisocyanate, furfurylidene diisocyanate and the mixtures as well as the derivatives (dimer, trimer, biuret or allophanate) of these compounds.

Mention may be made, as examples of cycloaliphatic polyisocyanates, of isophorone diisocyanate (IPDI), 1,3-cyclopentylene diisocyanate, 1,4-cyclohexylene diisocyanate, 1,2-cyclohexylene diisocyanate and the mixtures and derivatives (dimer, trimer, biuret or allophanate) of these compounds.

Mention may be made, as examples of aromatic polyisocyanates, of 4,4'-diphenylmethane diisocyanate (MDI) and its isomers, in particular 2,4'- and 2,2'-diphenylmethane diisocyanate, toluene diisocyanate (TDI) and its isomers, in particular 2,4- and 2,6-toluene diisocyanate, 2,2-diphenylpropane 4,4'-diisocyanate, p-phenylene diisocyanate, m-phenylene diisocyanate, xylene diisocyanate, 1,4-naphthalene diisocyanate, 1,5-naphthalene diisocyanate, azobenzene 4,4'-diisocyanate, diphenyl sulphone 4,4'-diisocyanate, 1-chlorobenzene 2,4-diisocyanate, 4,4',4''-triisocyanatotriphenylmethane, 1,3,5-triisocyanatobenzene, 2,4,6-triisocyanatotoluene, 4,4'-dimethyldiphenylmethane 2,2',5,5'-tetraisocyanate and the mixtures of these compounds.

Use is preferably made of diisocyanates and more particularly MDI and its isomers, TDI and its isomers, MDI, IPDI and their derivatives.

Mention will be made, as illustration of polydienepolyols (B) which can be used according to the present invention, of the hydroxytelechelic conjugated diene oligomers which can be obtained by various processes, such as the radical polymerization of a conjugated diene having from 4 to 20 carbon atoms in the presence of a polymerization initiator, such as hydrogen peroxide or an azo compound, such as 2,2'-azobis[2-methyl-N-(2-hydroxyethyl)propionamide], or the anionic polymerization of a conjugated diene having from 4 to 20 carbon atoms in the presence of a catalyst, such as dilithium naphthalene.

According to the present invention, the conjugated diene of the polydienepolyol is chosen from the group comprising butadiene, isoprene, chloroprene, 1,3-pentadiene and cyclopentadiene. The number-average molar mass of the polyols which can be used can vary from 500 to 15,000 and preferably from 1,000 to 3,000.

According to the present invention, use will preferably be made of a polydienepolyol based on butadiene. The polydienepolyol advantageously comprises 70 to 85 mol %, preferably 75 mol %, of units

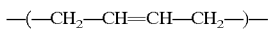

and 15 to 30%, preferably 25%, of units

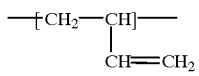

Copolymers of a conjugated diene and of a vinyl and acrylic monomer, such as styrene or acrylonitrile, are also suitable.

It would not be departing from the invention if use were made of hydroxytelechelic butadiene oligomers epoxidized on the chain or alternatively of hydroxytelechelic hydrogenated oligomers of conjugated dienes.

The OH number, expressed in meq/g, is between 0.5 and 5 and their viscosity is between 500 and 100,000 mPa.s at 30° C.

Mention will be made, as illustration of polydienepolyols, of the polybutadienes with hydroxylated endings sold by the company Elf Atochem S.A. under the names Poly Bd® R45 HT and Poly Bd® R20 LM.

The polymer of the invention can also comprise a chain extender.

Chain extender now denotes compounds carrying at least two functional groups which react with the isocyanate functional groups.

Mention will be made, as examples of such reactive functional groups, or hydroxyl functional groups and amine functional groups.

According to the invention, the chain extender can be chosen from polyols. Their molecular mass can be between 62 and 500.

Mention will be made, as illustration of such compounds, of ethylene glycol, propylene glycol, diethylene glycol, dipropylene glycol, 1,4-butanediol, 1,6-hexanediol, 2-ethyl-1,3-hexanediol, N,N-bis-(2-hydroxypropyl)aniline, 3-methyl-1,5-pentanediol and the mixture of at least two of the abovementioned compounds.

Polyamines can also be used as chain extenders. Their molecular mass can be between 60 and 500.

Mention will be made, as illustration of such polyamines, of ethylenediamine, diphenylmethanediamine, isophoronediamine, hexamethylenediamine or diethyltoluenediamine.

Use may be made of one part by weight of one or more abovementioned chain extenders per 100 parts by weight of polydienepolyol (B) employed and preferably 5 to 30 parts by weight.

The hydroxyl functional groups of the copolymer (C) can be introduced:
  by grafting or by copolymerization of an unsaturated monomer having at least one hydroxyl functional group;
  by grafting or by copolymerization of an unsaturated monomer and then reaction of this monomer with a product introducing at least one hydroxyl functional group;
  by modification of a grafted or copolymerized monomer to create at least one hydroxyl functional group.

The monomer containing a hydroxyl functional group can be, for example, allyl alcohol, N-(hydroxymethyl)acrylamide, 2-hydroxyethyl (meth)acrylate (HEA or HEMA) or the (meth)acrylates of diols, such as polyethylene glycol (PEG), polypropylene glycol (PPG) or polytetramethylene glycol (PTMG).

The unsaturated monomer can also be a carboxylic acid or an anhydride, for example (meth)acrylic acid and maleic anhydride. These acids or anhydrides are subsequently neutralized with a diol, such as ethylene glycol, PEG, PPG or PTMG.

The hydroxyl functional group can also be produced by hydrolysis of a vinyl ester of a saturated carboxylic acid, such as vinyl acetate or propionate.

The copolymer (C) is advantageously a copolymer of ethylene, of an unsaturated carboxylic acid ester and of an unsaturated monomer having at least one hydroxyl functional group or a copolymer of ethylene, of a vinyl ester of a saturated carboxylic acid and of an unsaturated monomer having at least one hydroxyl functional group.

Mention may be made, as example of unsaturated carboxylic acid ester, of alkyl (meth)acrylates, the alkyls having from 1 to 24 carbon atoms, in particular methyl, ethyl, n-butyl, isobutyl or 2-ethylhexyl (meth)acrylates.

Mention may be made, as example of vinyl esters of saturated carboxylic acids, or vinyl acetate and vinyl propionate.

The copolymer (C) is advantageously obtained by direct copolymerization (in contrast to grafting).

The copolymer (C) advantageously contains, by weight, 40 to 95% of ethylene, 4 to 40% of comonomer and 1 to 15% of monomer containing at least one hydroxyl functional group. The melt index of the copolymer (C), according to ASTM D 1238-73, is advantageously between 1 and 1000 (g/10 min).

The copolymer (C) preferably contains from $10^{-3}$ to $45 \times 10^{-2}$ mol of OH per 100 g of copolymer.

The copolymer (C) can be diluted in a polymer (C1) not containing hydroxyl functional groups and being neutral with respect to these hydroxyl functional groups.

(C1) can be a polyethylene homo- or copolymer, a copolymer of ethylene and of an unsaturated carboxylic acid ester, a copolymer of ethylene and of a vinyl ester of a saturated carboxylic acid, a styrene/butadiene/styrene (SBS) block copolymer, a styrene/isoprene/styrene (SIS) block copolymer or these hydrogenated (SEBS) block copolymers.

In the present compositions, free isocyanate functional groups remain. The content of free NCO functional groups is preferably between 1 and 10 weight % of free NCO functional groups with respect to the total weight of the adhesive. This content is preferably from 1 to 5%. This content makes it possible to achieve a good compromise between the rate of crosslinking of the adhesive (after bonding) and its stability when heated (before bonding).

The polymer is advantageously prepared in the presence of a chain-limiting monoalcohol (D) which can exhibit tackifying properties.

The compositions according to the present invention can additionally contain:
  one or more tackifying resins (E). The preferred tackifying resins are aliphatic or aliphatoaromatic (including natural or synthetic terpene resins) and do not generally contain functional groups which are reactive with isocyanates. However, it would not be departing from the scope of the invention if use were made of a polyfunctional hydroxylated tackifying resin, provided that this is taken into account in the NCO/OH ratio and that the viscosity of the compositions of the invention is compatible with their use,
  waxes (F),
  additives (G), such as plasticizers, fillers or stabilizers which are chemically neutral with respect to isocyanates.

The tackifying resins or the weakly hydroxylated waxes can be used, provided that the hydroxyl functional groups which they introduce are taken into account in calculating the total NCO/total OH molar ratio and that the amount of alcohol (D) used for the reaction with the excess polyisocyanate is decreased in proportion.

These tackifying resins, waxes or plasticizers are used in a known way in the hot-melt adhesives to modify the viscosity, the assembly time and the adhesiveness.

It is recommended that the compositions of the invention should have a viscosity which is determined, that is to say sufficiently fluid, to permit a rapid setting of bonding at a relatively low temperature when exposed to the atmosphere, for the purpose of producing a bonding which can subsequently withstand a temperature of at least 150° C.

The compositions of the invention contain essentially no free OH functional groups.

The viscosity of the compositions of the invention is advantageously less than 10,000 mPa.s and preferably between 2000 and 6000 mPa.s. These viscosities are measured at the temperatures of application of the HMA of the present invention.

There are no restrictions on the proportions of (B) and (C); B/C by weight is advantageously between 1/100 and 100/1 and preferably from 1/10 to 2/1.

There are no restrictions on the proportions by weight of (C1) with respect to (C); C1/C is preferably between 1/20 and 20/1.

The optional amount of (D) is such that D/(B+C) is, by weight, between 0 and 5 and preferably from 0 to 2.

The NCO/OH molar ratio is chosen in order to avoid gelling during the synthesis.

This ratio is advantageously between 2 and 30 and preferably 2 to 5.

The amount of tackifying resin (E) is defined by the (E)/(B+C) ratio, by mass, ranging from 0 to 10, preferably 0 to 1.

The amount of wax (F) is defined by the (F)/(B+C) ratio, by mass, ranging from 0 to 10, preferably 0 to 0.5.

The compositions of the invention can be prepared by mixing the various constituents in the molten state.

At the mixing temperature, usually between 100 and 150° C., the reaction between the NCO groups and the OH groups is rapid and takes place in at most a few hours. The polymer obtained crosslinks on contact with atmospheric moisture: for good preservation thereof, it should be stored with moisture excluded.

According to an alternative form, another subject of the present invention is a process for the preparation of a composition in which, first:
  a) the polydienepolyol (B), the copolymer (C) and optionally the tackifying resins (E), the waxes (F) and the additives (G) are melted and dried, and then
  b) the polyisocyanate (A) and the optional monoalcohol (D) are added and reacted until the desired level of NCO is obtained. If (D) has little volatility, it can be introduced in stage a).

Thus, in practice, it is possible to proceed as follows:
  the hot-melt adhesives according to the invention are advantageously manufactured in a single stage according to the following process:
    all the constituents of the formula, with the exception of the diisocyanate and the monoalcohol, are premelted at 100–160° C. and dried under reduced pressure in a stirred reactor. The reactor is purged with dry nitrogen;
    the dry monoalcohol and then the diisocyanate are then introduced in suitable proportions and the isocyanate/alcohol reaction is continued at 120–125° C. until the theoretical level of NCO is obtained. At the end of the reaction, the ready-for-use hot-melt adhesive is recovered by pouring. In the case of aromatic diisocyanates, the operation is generally carried out in the absence of catalyst. For less reactive diisocyanates (IPDI), it is possible to use known catalysts of the NCO/OH reaction, such as tin salts (dibutyltin laurate DBTL) or amines (diazabicylooctane).

The process can be carried out in one stage as described above, that is to say be adding (A) and (D) simultaneously, or else in two stages, by adding first (A) and then subsequently (D).

Use is made of diisocyanates, such as 2,4-toluene diisocyanate (TDI), diphenylmethane diisocyanate (MDI), hexamethylene diisocyanate (HDI) or isophorone diisocyanate (IPDI). Because of its lower toxicity, MDI is the preferred diisocyanate of the invention. The reaction between the copolymer (C) and the diisocyanate takes place in the presence of a large molar excess of diisocyanate, in order to avoid any undesired increase in the viscosity.

The excess needed depends on the OH functionality of the copolymer (C) and of the polydiene (B) and on the isocyanate functionality and on the reactivity of the diisocyanate used (a diisocyanate in which both NCO functional groups have the same reactivity (MDI) requires a larger molar excess than a diisocyanate in which the two NCO functional groups do not have the same reactivity (TDI)).

The viscosity of the adhesives of the invention at their temperature of use (110 to 140° C.) is typically from 2000 to 6000 mPa.s. After storage at 130° C. for 4 hours, in contact with the atmosphere, the increase in viscosity of the adhesives of the invention is of the order of 15%, which makes possible problem-free industrial use with existing machines (for example, Nordson Meltex coating device).

The present invention thus provides single-component hot-melt adhesives which offer an ease of use, a high storage stability, i.e. several months at 25° C. and several hours at 130–140° C., viscosities of use $\leq$10,000 mPa.s, an appropriate assembly times of 5 to 40 s, a high initial cohesion, a creep temperature under load (SAFT) which increases in step with the progress of the crosslinking, and a flexibility of the product after complete crosslinking. The crosslinking takes place between a few hours and a few days, depending on the temperature and the atmospheric moisture. This reaction can be accelerated by organometallic catalysts of the DBTL type.

EXAMPLES

The free isocyanate content of the adhesives according to the invention is expressed hereinbelow in grams of NCO per 100 g of adhesive. It is determined according to AFNOR Standard 52132.

The flow index (MFI) is measured at 190° C. under 2.16 kg, according to ASTM Standard D 1238-73, and expressed in g/10 min.

In the following examples, the following properties are considered in evaluating the compositions of the invention:
  measurement of the SAFT (Shear Adhesion Failure Temperature) according to ASTM D 4498:
    use of panels of size:
    100 mm×25 mm×1 mm.
  A region of 25 mm×25 mm is defined with a marker at the end of a test piece.
  Four small panels are positioned, followed by four others adjoining in the length direction, which will be used as shims on the platen of the heat press at 150° C. or any other temperature of use.
  The molten adhesive is poured onto the parts to be coated with adhesive.
  Four other test pieces are applied in order to obtain adhesive-coated areas of 25 mm×25 mm.
  Pressing is carried out for five seconds at 250 daN. The test pieces are stored at 23° C. for at least four hours.
  A 0.5 kg weight is hung at each end and the assembly is placed in an oven programmed for a temperature rise of 0.4° C./minute.
  On the same day as the bonding, the temperature at which the weight falls is recorded, that is to say the moment when the adhesive seal fails. A mean of the four measurements is taken.

measurement of the cloud point:
  a thermometer is immersed in the homogeneous hot melt at 180° C.
  When the temperature of the thermometer reaches 150° C., it is withdrawn from the pot with the adhesive on the bottom part. The temperature at which the product congeals is recorded.
measurement of the viscosity;
  on a device of Brookfield DVII type—Rotor 27 at 10 revolutions/minute.
The following products are used:
(C) EVA/HEA: ethylene/vinyl acetate/2-hydroxyethyl acrylate copolymer with an MFI of 450 and containing 32% by weight of vinyl acetate and 2.15% by weight of HEA, manufactured by the company Elf Atochem.
(B) Poly BD® 45 HT: polybutadiene with hydroxylated endings with a relative density of 0.90; Mn=2,800; viscosity 5000 mPa.s at 30° C.; OH number=0.83 meq/g, manufactured by the company Elf Atomchem.
(E) Kristalex F85: α-methylstyrene resin, supplied by the company Hercules
(A) Isonate 125: pure MDI supplied by the company Dow Dodecanol
(D) RH 37 NC: hydroxylated tackifying resin, supplied by the company Hercules. The hydroxyl number is 0.57 meq/g and the Brookfield viscosity is 2000 mPa.s at 100° C.
Synthesis of the hot melt of the invention

Example 1

⇒ The reactor is sparged with dry nitrogen for ¼ of an hour. The jacket is heated to 130° C.
⇒ (B), (C), (E), (F) and (G) are charged.
⇒ The mixture is placed under vacuum at this temperature for one hour (degassing).
⇒ (A) and (D) are charged, the two components being preheated to 60° C.
⇒ The reaction mixture is held at 130° C. under vacuum for 4 hours.
⇒ The reaction mixture is removed from the pot and characterized.

Results

The composition examples according to the invention are listed in Table 1.

The reference recorded in the table (ref.) corresponds to a non-crosslinkable hot melt based on the following ethylene/vinyl acetate copolymers:

EVA 1: supplied by the company Elf Atochem with the trade name Evatane® 2805 (flow index 5 g/10 min according to ASTM D 1238/72 and vinyl acetate content, by mass, of 28%).

EVA 2: supplied by the company Elf Atochem with the trade name Evatane® 18500 (melt index 500 g/10 min according to ASTM D 1238/73 and vinyl acetate content, by mass, of 18%).

Stability on storage. Measurements of the viscosity at 130° C. on the first day (D).

Taking into account the uncertainties in measurement, it may be said that the viscosity remains stable from D to D+19, which indicates that there is no intrinsic hot-melt reaction if there is no contact with atmospheric moisture.

Thermal stability at 130° C. Measurement of the viscosity at D after 4 hours at 130° C.

The values are again very similar.

The increase in viscosity reaches a maximum of 18%, which can seem significant. When this percentage is converted to a viscosity value of the order of 300 mPa.s, it can reasonably be said that this gain is negligible for an application of hot-melt type.

Influence of the reactivity on the SAFT values

In the various evaluation series, the SAFT results are greater than 180 C. from the seventh day (D+7) of storage at 23° C./50% relative humidity of the adhesively-bonded assemblies, whereas the EVA-based non-reactive hot melt retains lower SAFT values, around 80° C., which are constant over time.

The viscosity of the hot melt according to Example 1 is 1350 mPa.s at 130° C. and 4750 mPa.s at 100° C., which allows it to be employed at approximately 110° C.

Example 2

The hot melt according to Example 2 was prepared by the same process as Example 1 but with a larger amount of (E) and (F).

The results show satisfactory stability on storage and satisfactory thermal stability; moreover, the SAFT changes in a way comparable to Example 1.

Example 3

The hot melt according to Example 3 repeats the composition of Example 2 but in a two-stage process.

The characterization of this adhesive results in the same conclusions as those obtained with respect to the two preceding examples.

Example 4

The hot melt according to Example 4 repeats the process of Example 2 but with a (C)/(B) ratio by mass equal to 1. In addition to the preceding unchanged conclusions, a decrease in the viscosity with a decrease in the (C)/(B) ratio is observed.

Example 5

The hot melt according to Example 5 repeats the formulation and the process of Example 4 but with a lower (D)/(B+C) ratio.

In addition to the preceding conclusions, an increase in viscosity related to a decrease in the abovementioned ratio is observed.

The measurements of the cloud point temperatures between the first and thirtieth day remain very similar, which indicates good homogeneity and stability of the various hot melts.

TABLE 1

| FORMULATION (g) | Ref. | 1 | 2 | 3 | 4 | 5 |
|---|---|---|---|---|---|---|
| EVA/HEA (C) | 0 | 70 | 70 | 70 | 50 | 70 |
| EVA 1 | 50 | 0 | 0 | 0 | 0 | 0 |
| EVA 2 | 50 | 0 | 0 | 0 | 0 | 0 |
| Poly Bd R45HT (B) | 0 | 30 | 30 | 30 | 50 | 30 |
| Kristalex F85 (E) | 100 | 30 | 100 | 100 | 100 | 100 |
| Paraflint H2 (F) | 50 | 0 | 50 | 50 | 50 | 50 |
| Dodecanol (D) | 0 | 59.97 | 59.97 | 59.97 | 80.41 | 26.47 |
| MDI 125 (A) | 0 | 94.63 | 94.63 | 94.63 | 126.88 | 47.31 |
| Process | — | 1 stage | 1 stage | 1 stage | 2 stages | 1 stage |

The Brookfield viscosity is measured on the 1st, 11th and 20th day after the synthesis
Needle No. 27, 10 rev/min, 130° C.

| VISCOSITY mPa.s | Ref. | 1 | 2 | 3 | 4 | 5 |
|---|---|---|---|---|---|---|
| D | 12,500 | 1350 | 600 | 500 | 275 | 1400 |
| D + 10 | 12,650 | 1350 | 625 | 575 | 275 | 1430 |
| D + 19 | 12,575 | 1330 | 575 | 450 | 300 | 1450 |

The Brookfield viscosity is measured on the first day at 130° C. and after ageing for 4 hours at 130° C. on the same day. Needle No. 27, 10 rev/min, 130° C.

| VISCOSITY mPa.s | Ref. | 1 | 2 | 3 | 4 | 5 |
|---|---|---|---|---|---|---|
| D | 12,500 | 1350 | 600 | 500 | 275 | 1400 |
| After 4 h at 130° C. | 12,625 | 1470 | 625 | 525 | 325 | 1580 |

The test pieces prepared are tested on the same day and regularly for 1 week.
Substrate: Kraft paper. Temperature rise: 0.4° C./min

| SAFT (° C.) on Kraft | Ref. | 1 | 2 | 3 | 4 | 5 |
|---|---|---|---|---|---|---|
| D | 78 | 47 | 83 | 78 | 70 | 77 |
| D + 1 | 80 | 98 | 92 | 85 | 91 | 92 |
| D + 2 | 79 | 125 | 98 | 94 | 125 | 145 |
| D + 3 | 81 | 142 | 129 | 100 | 125 | 150 |
| D + 6 | 78 | 175 | 178 | 142 | 180 | 180 |
| D + 7 | 79 | 180 | 180 | 160 | 180 | 180 |

| CLOUD POINT ° C. | Ref. | 1 | 2 | 3 | 4 | 5 |
|---|---|---|---|---|---|---|
| D | 100 | 60 | 120 | 120 | 110 | 130 |
| D + 29 | 100 | 65 | 118 | 117 | 115 | 130 |

What is claimed is:

1. A hot-melt adhesive (HMA) composition comprising a polymer containing free isocyanate functional groups, the said polymer resulting from the reaction of a polyisocyanate (A), of a polydienepolyol (B) and of a copolymer (C) of ethylene containing hydroxyl functional groups.

2. A composition according to claim 1, in which the polydiene (B) is a polybutadiene with hydroxyl terminal groups.

3. A composition according to claim 1, in which (C) is a copolymer of ethylene and of an unsaturated monomer having at least one hydroxyl functional group.

4. A composition according to claim 3, in which (C) is a copolymer of ethylene, of vinyl acetate and of 2-hydroxyethyl (meth)acrylate.

5. A composition according to claim 1, further comprising at least one of the following products:
   (D) monoalcohol
   (E) a tackifying resin
   (F) a wax.

6. A composition according to claim 2, in which (C) is a copolymer of ethylene and an unsaturated monomer having at least one hydroxy functional group.

7. A composition according to claim 6, in which (C) is a copolymer of ethylene, vinyl acetate and 2-hydroxyethyl (meth) acrylate.

* * * * *